(12) United States Patent
McCloskey et al.

(10) Patent No.: US 8,273,832 B2
(45) Date of Patent: Sep. 25, 2012

(54) BLOCK TERPOLYMER WITH CONFINED CRYSTALLIZATION

(75) Inventors: Patrick Joseph McCloskey, Watervliet, NY (US); Amitabh Bansal, Rhinebeck, NY (US); Julia Lam Lee, Niskayuna, NY (US); Warren William Reilly, Northville, NY (US)

(73) Assignee: General Electric Company, Niskayuna, NY (US)

( * ) Notice: Subject to any disclaimer, the term of this patent is extended or adjusted under 35 U.S.C. 154(b) by 885 days.

(21) Appl. No.: 12/391,683

(22) Filed: Feb. 24, 2009

(65) Prior Publication Data

US 2010/0216058 A1    Aug. 26, 2010

(51) Int. Cl.
*C08L 53/02* (2006.01)

(52) U.S. Cl. .................. 525/404; 525/408; 525/463

(58) Field of Classification Search .............. 525/404, 525/408, 463
See application file for complete search history.

(56) References Cited

U.S. PATENT DOCUMENTS

| 3,974,078 A * | 8/1976 | Crystal ............... 430/110.2 |
| 2006/0057372 A1 | 3/2006 | Dollase et al. |
| 2008/0158627 A1 | 7/2008 | Lawrence et al. |

OTHER PUBLICATIONS

Cheng et al., "Synthesis of Block Copoly(polyethylene glycol-styrene) by the Macromonomer and Macroinitiator Method", Materials Chemistry and Physics, vol. 78, pp. 581-590, 2003.
Müler et al., "Crystallization in Block Copolymers with More than One Crystallizable Block", Progress in Understanding of Polymer Crystallization, vol. 714, pp. 229-259, 2007.

* cited by examiner

*Primary Examiner* — Jeffrey Mullis
(74) *Attorney, Agent, or Firm* — Joseph J. Christian

(57) ABSTRACT

A polyester block terpolymer comprising an amorphous block comprising a polystyrene dicarboxylate; a crystallizable block comprising a polyethylene glycol; and an aliphatic diol block; wherein the amorphous block is a continuous phase and the crystallizable block is a dispersed phase, and wherein the dispersed phase is less than about 200 nanometers in size.

9 Claims, No Drawings

BLOCK TERPOLYMER WITH CONFINED CRYSTALLIZATION

FIELD OF THE INVENTION

The invention includes embodiments that relate to a block terpolymer. More particularly, the invention includes embodiments that relate to a polyester block terpolymer with confined crystallization for use in holographic data storage.

BACKGROUND OF THE INVENTION

Optically clear plastics that demonstrate confined crystallization are useful for various applications including holographic data storage. Materials which exhibit the ability to undergo a threshold phase change and concomitant change in refractive index have been reported as a potential method to read and write holograms in a suitable storage media. Certain block copolymers are known to provide materials which will phase separate and exhibit confined crystallization. However, a commercially viable material has yet to be discovered. Accordingly, there is a need for improved materials which are easily processed and can transition between a crystalline phase and an amorphous phase while maintaining a high degree of optical clarity, through which enhanced holographic data storage applications can be achieved.

BRIEF SUMMARY OF THE INVENTION

In one embodiment, a polyester block terpolymer comprises an amorphous block comprising a polystyrene dicarboxylate; a crystallizable block comprising a polyethylene glycol; and an aliphatic diol block; wherein the amorphous block is a continuous phase and the crystallizable block is a dispersed phase, and wherein the dispersed phase is less than about 200 nanometers in size.

In another embodiment, a method for storing holographic data comprises the steps of (a) providing an optically transparent substrate comprising a polymer composition and a light absorbing chromophore, the polymer composition comprising an amorphous block comprising a polystyrene dicarboxylate; a crystallizable block comprising a polyethylene glycol; and an aliphatic diol block; wherein the amorphous block is a continuous phase and the crystallizable block is a dispersed phase, and wherein the dispersed phase is less than about 200 nanometers in size; and (b) irradiating a volume element of the optically transparent substrate with a holographic interference pattern, wherein the pattern has a first wavelength and an intensity both sufficient to cause a phase change in at least a portion of the dispersed phase within the volume element of the substrate to produce within the irradiated volume element refractive index variations corresponding to the holographic interference pattern, thereby producing an optically readable datum corresponding to the volume element.

DETAILED DESCRIPTION OF THE INVENTION

Some aspects of the present invention and general scientific principles used herein can be more clearly understood by referring to U.S. patent application Ser. No. 11/901,725, filed on Sep. 18, 2007, which is incorporated herein by referenced in its entirety.

As defined herein, the term "optically transparent" as applied to an optically transparent substrate or an optically transparent plastic material means that the substrate or plastic material has an absorbance of less than 1. That is, at least 10 percent of incident light is transmitted through the material at least one wavelength in a range between about 300 to about 800 nanometers. For example, when configured as a film having a thickness suitable for use in holographic data storage said film exhibits an absorbance of less than 1 at least one wavelength in a range between about 300 and about 800 nanometers.

As defined herein, the term "volume element" means a three dimensional portion of a total volume.

As defined herein, the term "optically readable datum" can be understood as a datum that is stored as a hologram patterned within one or more volume elements of an optically transparent substrate.

Disclosed herein is a random polyester block terpolymer including an amorphous block, a crystallizable block, and a diol block. The block terpolymer may be formed by esterifying a first polymer, a second polymer and a diol, using any method known to those skilled in the art.

In one embodiment, the first polymer, second polymer and diol are combined with a solvent and catalyst to form a solution. The solution is then heated to reflux to form a random block terpolymer composition. Suitable solvents include o-dichlorobenzene, toluene, and m-cresol. The catalyst may be any protic acid including, for example, p-TSA and phosphoric acid. The block terpolymer composition is cooled and then combined with an antisolvent to precipitate out the terpolymer. Any antisolvent suitable for precipitating the terpolymer can be used. In one embodiment, the antisolvent comprises a hexane, a pentane, or a combination thereof. The resulting terpolymer powder can be separated from the antisolvent by filtration and then dried to form a powder. Any suitable method of filtration and drying known to those skilled in the art can be used.

The polyester block terpolymer is particularly useful in data storage media, including holographic data storage. In one embodiment, extruded pellets formed from the block terpolymer are injection molded into discs suitable for holographic data storage.

As stated above, the amorphous block is formed from and comprises the first polymer. Examples of suitable first polymers include polystyrenes, including polystyrene dicarboxylate; polymethylmethacrylate; polycarbonates, including BPA-polycarbonate; and polyethers, including polyetherimides. In an exemplary embodiment, the first polymer is polystyrene dicarboxylate comprised of polystyrene terminated with carboxylic acid.

The crystallizable block of the terpolymer is formed from and comprises the second polymer. Examples of suitable second polymers include polyethylene glycol (PEG), nylon, polyalkenes, polybutylteraphthalate, polyethylene terapthalate, polyvinyl acetate, polyvinyl chloride, polyphenyl sulphone, and polycaprolactone. In an exemplary embodiment, the first polymer is comprised of polyethylene glycol.

The block terpolymer may comprise from about 40 weight percent to about 90 weight percent of the first polymer based on the total weight of the block terpolymer. In another embodiment, the block terpolymer comprises from about 60 weight percent to about 80 weight percent of the first polymer. In an exemplary embodiment, the block terpolymer comprises from about 70 weight percent to about 80 weight percent of the first polymer.

The block terpolymer may comprise from about 10 weight percent to about 50 weight percent of the second polymer based on the total weight of the block terpolymer. In another embodiment, the block terpolymer comprises from about 10 weight percent to about 40 weight percent of the second polymer based on the total weight of the block terpolymer. In an exemplary embodiment, the block terpolymer comprises from about 20 weight percent to about 30 weight percent of the second polymer based on the total weight of the block terpolymer.

As used herein, the term "diol" refers to an organic compound containing two hydroxy groups. The diol block may be comprised of any aliphatic diol. For example, the diol block may comprise polyhexamethylene diol (Mn=1000) or polybutylene adipate diol (Mn=1000).

The block terpolymer may comprise from about 0.01 weight percent to about 40 weight percent of the diol present in the diol block, based on the total weight of the block terpolymer. In another embodiment, the block terpolymer comprises from about 2 weight percent to about 20 weight percent of the diol. In an exemplary embodiment, the block terpolymer comprises from about 3 weight percent to about 15 weight percent of the diol present in the diol block.

The addition of the diol block to the terpolymer allows the weight ratio and size of the amorphous block and crystallizable block to be independently varied, while still maintaining an overall balanced stoichiometry to build a high molecular weight block terpolymer. In one embodiment, the block terpolymer has a molecular weight of at least about 30,000 Daltons. In one embodiment, the block terpolymer has a molecular weight of at least about 40,000 Daltons. In yet another embodiment, the block terpolymer has a molecular weight of at least about 50,000 Daltons.

As previously stated, the size of the amorphous and crystallizable blocks can be independently varied. For example, the size of the amorphous block may be between about 2,000 and about 25,000 Daltons. In another embodiment, the size of the amorphous block is between about 4,000 and about 15,000 Daltons. The size of the crystallizable block may be between about 2,000 and about 20,000 Daltons. In another embodiment, the size of the crystallizable block is between about 4,000 and about 10,000 Daltons.

The individual polymers or blocks making up the block terpolymer may be semicrystalline and can display amorphous and/or crystalline behavior depending on temperature. For example, the polyester block terpolymer may be formed under conditions to produce a block terpolymer, or article comprising the terpolymer, that includes an amorphous block having a continuous amorphous phase and a crystallizable block having a crystalline dispersed phase. Alternatively, conditions may be controlled so that the dispersed phase crystallizable block is amorphous.

Micro-phase separation of the block terpolymer can be induced upon a brief or extended heating or annealing of the terpolymer above the glass transition temperature ($T_g$) and melting temperature ($T_m$) of the individual blocks. The resulting microphase separated block terpolymer is amorphous when the annealing temperature is higher than the melting point of the crystallizable block. Upon cooling close to the crystallization temperature, the crystallizable block crystallizes, while maintaining the shapes of the original microphases.

For example, when the block terpolymer is cast into a film or molded into an article, the individual blocks phase separate from one another. However, because the respective polymers are chemically bound to one another, the polymer blocks cannot macrophase separate. The polymers microphase separate into very small domains and the domain size is determined by the molecular weights of the individual polymer blocks. Typically, the dispersed phase of the polymer takes the form of tiny domains having a size less than about 200 nanometers (nm). This means that while the domains of the dispersed phase may vary in size, on average the longest path length across a domain of the dispersed phase will be less than about 200 nm in length. In one embodiment, the average longest path length across a domain of the dispersed phase will be less than about 100 nm in length. In another embodiment, the average longest path length across a domain of the dispersed phase will be less than about 50 nm in length. In yet another embodiment, the average longest path length across a domain of the dispersed phase will be less than about 40 nm in length. The domains of the dispersed phase are distributed essentially uniformly throughout the continuous phase. The weight ratio and molecular weights of the amorphous and crystallizable blocks and overall molecular weight can be used to control the geometry of the individual microphases. The dispersed crystallizable phase may be in the form of spheres, cylinders etc. within the amorphous continuous phase.

For holographic data storage applications, it is useful that the morphology of the block terpolymer after microphase separation remains unchanged during further crystallization and/or melting of the crystallizable block forming the dispersed phase. The continuous and the dispersed phases are at times also referred to as the majority and minority blocks respectively. Such a condition can be easily met if the majority block, also referred to as the matrix, is in a glassy or highly cross-linked state during crystallization of the minority block. In other words, it is useful that the block terpolymers for holographic data storage applications are formed such that the temperature for order-disorder transition of the block terpolymer is higher than the glass transition of the matrix-forming block and that the latter is higher than the crystallization and melting temperatures of the block forming the dispersed phase: $T_{order-disorder} > T_{g\ (matrix)} > T_{crystallization\ (dispersed\ phase)}$ and $T_{m\ (dispersed\ phase)}$.

In one embodiment the polyester block terpolymer comprises a crystallizable block dispersed phase that has a degree of crystallinity between about 0.01 percent and about 100 percent at a temperature below the Tg of the terpolymer. In one embodiment, the crystallizable block has a degree of crystallinity between about 15 percent and about 80 percent at a temperature below the Tg of the terpolymer. In another embodiment, the crystallizable block dispersed phase in the block terpolymer has a degree of crystallinity between about 25 percent and about 60 percent at a temperature below the Tg of the terpolymer. In yet another embodiment, the crystallizable block has a degree of crystallinity of at least 10 at a temperature below the Tg of the terpolymer. The crystallizable block present in the block terpolymer can be thermally or optically induced to change from an amorphous phase to a crystalline phase or vice versa. This change in the crystallizable block phase results in a change in the refractive index of the block terpolymer.

The block terpolymer is optically transparent. As used herein, "optical transparency" is defined as the percent of incident light that is transmitted through the terpolymer at least one wavelength in a range between about 300 to about 800 nanometers. The block terpolymer may have an optical transparency of at least about 65%. In another embodiment, the block terpolymer has an optical transparency of at least about 75%. In yet another embodiment, the block terpolymer has an optical transparency of at least about 85%.

As noted, holographic data storage relies upon the introduction of localized variations in the refractive index of the optically transparent substrate comprising the photochemically active dye as a means of storing holograms. The refractive index within an individual volume element of the optically transparent substrate may be constant throughout the volume element, as in the case of a volume element that has not been exposed to electromagnetic radiation, or in the case of a volume element in which the photosensitive component has been irradiated to the same degree throughout the volume element. It is believed that most volume elements that have been exposed to electromagnetic radiation during the holographic data writing process will contain a complex holographic pattern, and as such, the refractive index within the volume element will vary across the volume element. In instances in which the refractive index within the volume element varies across the volume element, it is convenient to regard the volume element as having an "average refractive index" which may be compared to the refractive index of the corresponding volume element prior to irradiation. Thus, in one embodiment an optically readable datum comprises at least one volume element having a refractive index that is different from a (the) corresponding volume element of the optically transparent substrate prior to irradiation.

Data storage is traditionally achieved by locally changing the refractive index of the data storage medium in a graded fashion (continuous sinusoidal variations), rather than discrete steps, and then using the induced changes as diffractive optical elements.

Volumetric optical storage systems have the potential to fulfill demands for high-capacity data storage. Unlike traditional optical disc storage formats, such as compact disc (CD) and digital versatile disc (DVD) formats, where the digital information is stored in a single (or at most two) reflective layer(s), according to an aspect of the present invention, the holograms representing digital content are stored as localized refractive index alterations in a plurality of volumes arranged in stacked (e.g. vertically), directed (e.g. laterally) tracks in the storage medium. Each of the laterally directed tracks may define a corresponding laterally, e.g., radially, directed layer.

According to an aspect of the present invention, single bits, or groups of bits, of data may be encoded as individual micro-holograms each substantially contained in a corresponding volume element. In one embodiment, the medium, or media, takes the form of an injection moldable thermoplastic disc, and exhibits one or more non-linear functional characteristics. The non-linear functional characteristics may be embodied as a refractive index change that is a non-linear function of exposure to an energy source, such as a holographic interference pattern (incident optical intensity), or heat. In such embodiments, by generating interference fringes within a given volume element of the medium, one or more bits of data may be selectively encoded in that volume element as detectable refractive index modulations which represent the stored holographic data.

According to an aspect of the present invention, a non-linear functional characteristic may establish a threshold energy responsive condition, below which no substantial change in refractive index occurs in the optically transparent substrate, and above which measurable changes in the refractive index of the optically transparent substrate are induced. In this manner, holographic data stored within a selected volume element of the optically transparent substrate can be read, or recovered, by exposure of the data-containing volume element to a read beam having an effective energy less than the threshold energy. Similarly, holographic data can be written or erased using a light beam having an effective energy in excess of the threshold energy. Accordingly, in one embodiment, dense matrices of volumes that each may, or may not, have a micro-hologram substantially contained therein may be established. Each of the micro-holograms is embodied in the optically transparent substrate as an alternating pattern of sub-regions having differing refractive indices, which correspond to the interference fringes of counter-propagating light beams used to write the micro-holograms. Where the refractive index modulation decays rapidly as a function of distance from a target volume, such as an encoded bit center, the more densely the volumes may be packed.

According to an aspect of the present invention, the refractive index changes in a particular volume element may be induced by localized heating patterns corresponding to the interference fringes of counter-propagating laser beams passing through the volume element. In one embodiment, the refractive index change results from a density difference between an amorphous state and a crystalline state of a thermoplastic medium. A transition from one state to the other state may be selectively induced within target volume elements within the medium by thermally activating the target volume elements by exposure of the target volume elements to the interference fringes of a holographic interference pattern.

In one embodiment, the present invention provides a method for storing holographic data within an optically transparent substrate comprising a polymer composition having a continuous phase and a dispersed phase. The polymer composition comprises the polyester block terpolymer described herein.

In one embodiment, the polymer composition is selected such that the dispersed phase is initially present in the polymer composition in an amorphous state or a crystalline state. As the optically transparent substrate comprising the polyester block terpolymer having the continuous phase and the dispersed phase is irradiated with a holographic interference pattern, a light absorbing chromophore present in the polymer composition absorbs light and creates hot spots as a function of the intensity of the holographic interference pattern. The hot spots correspond to regions of constructive interference within the holographic interference pattern. The heat generated within the regions of constructive interference causes that portion of the dispersed phase within a hot spot to undergo a phase change from either an amorphous state to a crystalline state, or from a crystalline state to an amorphous state. Although heat dissipates into the surrounding polymer composition after irradiation, the temperature rise outside of the hot spots is insufficient to effect a phase change of the dispersed phase outside of the hot spots.

Changes in the refractive index within the optically transparent substrate corresponding to an optically readable datum can occur by a variety of mechanisms as the optically transparent substrate is exposed to the holographic interference pattern. In a first instance, localized heating within the regions of constructive interference causes the dispersed phase to coalesce with the continuous phase in the region of the hot spot thereby creating refractive index gradients. In a second instance, the polymer composition comprising a dispersed phase and a continuous phase undergoes an order to disorder transition upon heating within the regions of constructive interference of the holographic interference pattern. In one embodiment, the phase change occurring in the hot spots results in an increase in an initial refractive index mismatch between the continuous phase and the dispersed phase. In an alternate embodiment, the phase change occurring in the hot spots results in a decrease in an initial refractive index mismatch between the continuous phase and the dispersed phase. In yet another embodiment, the phase change occurring in the hot spots results in the creation of a refractive index mismatch between the continuous phase and the dispersed phase.

According to an aspect of the present invention, loss of dynamic range in affected volume elements other than the target volume element during hologram formation is mitigated by using a recording material exhibiting a non-linear response to experienced power density. In other words, an optically transparent substrate exhibiting a non-linear recording property may be used in combination with the formation of a micro-hologram. The non-linear recording property of the optically transparent substrate is used to facilitate recording of holograms within the optically transparent substrate that is non-linear with light intensity (e.g. square, cubic, or of the threshold type), such that recording occurs only above a certain threshold light intensity. Such a non-linear recording characteristic of the optically transparent substrate reduces or eliminates loss of dynamic range in non-addressed volume elements, and facilitates reduction of the dimensions of the micro-holograms, and target volume elements.

In one embodiment, the light absorbing chromophore is a linearly responsive absorber. In certain embodiments, the light absorbing chromophore is a reverse saturable absorber and good control in localizing the heat produced as holograms are written into the optically transparent substrate is achieved. Lateral extension of the micro-holograms may be significantly smaller than the diameter of the waist of the focused laser beam(s). Limiting or eliminating consumption of dynamic range of the recording material outside of the recorded micro-holograms, hence increasing reflectivity of each micro-hologram and therefore data storage capacity, may thus be realized through the use of a non-linear recording medium according to an aspect of the present invention. In one embodiment, the light absorbing chromophore is dissolved in one of the phases, preferably the crystallizable phase. In an alternate embodiment, the light absorbing chromophore is attached to one or more of the blocks of the polyester block terpolymer. The block terpolymer bearing the light absorbing chromophore may then be molded or otherwise processed (solvent cast, extruded) into an optically transparent substrate within which holographic interference patterns may be recorded and from which optically readable data may be recovered. In one embodiment, "A" represents the fully amorphous block such as polystyrene dicarboxylate, "B" represents the crystallizable block such as polyethylene glycol, "C" represents the aliphatic diol block, and "D" represents a linear or RSA type of dye. The dye molecule "D" can be simply added to the block terpolymer upon processing, in which case the dye will distribute between the two polymer phases based on its partition coefficient. Functionality can be added to the dye molecule to preferentially cause it to be more soluble in one phase than the other phase. Alternatively, the dye molecule can be attached to the block terpolymer in various ways. In one embodiment, the dye molecule will concentrate in the center of the "B" phase, a multiblock copolymer. In an alternate embodiment, the dye molecule forms a shell around the B-phase. In another embodiment, depending on the affinity of the light absorbing chromophore for the "A" block or "B" block constituents the light absorbing chromophore "D" may concentrate in the "A" block phase, the "B" block phase, or be concentrated at the interface between the "A" block phase, the "B" block phase of the polymer composition.

The following examples are intended only to illustrate methods and embodiments in accordance with the invention and as such should not be construed as imposing limitations upon the claims.

EXAMPLES

Example 1

Synthesis of PSt-co-PEG Block Terpolymers

A mixture of carboxylated polystyrene and polyethylene glycol was heated to reflux in o-dichlorobenzene with 0.1 weight percent p-TSA as a catalyst. A diol such as polyhexamethylene diol (Mn=1,000) can be added in combination with the polyethylene glycol so as to maintain a balanced stoichiometry between diol and diacid. This mixture was heated to reflux with the removal of water for approximately 6 hours. The mixture was cooled and the terpolymer was isolated by precipitation into a hexane. The resulting powder was separated from the hexane by filtration and dried in a vacuum oven overnight at 50 degrees Celsius.

The block terpolymer was extruded to form a film. It was observed that the block terpolymer could be extruded at high temperatures without loss in molecular weight or performance. The resulting extrudate was then molded to provide 1 mm thick, optically clear sample, which could be used to write microholograms.

The above procedure was repeated using varying concentrations of carboxylated polystyrene, polyethylene glycol and hexamethylene carbonate diol. The heat of crystallization ($\Delta H_{cryst}$) and heat of melting ($\Delta H_{melt}$) were determined for each film. The refractive index of each block terpolymer was measured by spin coating the block terpolymer onto a silicon wafer. The terpolymer was cycled between the crystalline and amorphous states to measure the resulting refractive index change using an ellipsometer. In all cases, the $T_{crystallization}$ and $T_m$ of the block terpolymers were less than −20 degrees Celsius, and greater than 50 degrees Celsius, respectively.

The change in refractive index ranged from 0.005 to 0.013. In all cases, the block terpolymer samples could be used to write holograms via a 532 nm laser in conjunction with a dye to convert light into heat. The resulting diffraction efficiencies of the block terpolymers were at least $10^{-5}$ up to $10^{-3}$. It should be understood, that this range is not a limit of diffraction efficiency of the block terpolymers described herein, but rather an example. Diffraction efficiencies can be improved, for example, by better processing, the use of higher efficiency dyes and a higher volume fraction of the crystallizable block. The experimentation results are displayed in Table 1.

TABLE 1

| PS (wt %) | PEG (wt %) | diol (wt %) | PS block size (Daltons) | PEG block size (Daltons) | $\Delta H_{cryst}$ (J/g) | $\Delta H_{melt}$ (J/g) | Film | Reflectivity | Ellipsometer |
|---|---|---|---|---|---|---|---|---|---|
| 68.5 | 12.5 | 19 | 4000 | 10000 | 4.1 | 9.1 | translucent | N/A | 0.001 |
| 66 | 17 | 17 | 4000 | 10000 | 1.2 | 16.6 | translucent | 0.006 | 0.002 |
| 64 | 19 | 17 | 4000 | 10000 | 2.7 | 17.7 | clear | 0.006 | 0.002 |
| 67 | 21 | 12 | 4000 | 10000 | 3.6 | 18.3 | clear | 0.008 | 0.007 |
| 61.7 | 22 | 16 | 4000 | 10000 | 2.1 | 20 | clear | 0.009 | 0.005 |
| 73.1 | 19.9 | 7 | 9500 | 10000 | 6.6 | 17.5 | translucent | 0.010 | 0.004 |
| 77 | 18 | 5 | 15000 | 10000 | 9.2 | 17.9 | clear | 0.008 | 0.004 |

TABLE 1-continued

| PS (wt %) | PEG (wt %) | diol (wt %) | PS block size (Daltons) | PEG block size (Daltons) | $\Delta H_{cryst}$ (J/g) | $\Delta H_{melt}$ (J/g) | Film | Reflectivity | Ellipsometer |
|---|---|---|---|---|---|---|---|---|---|
| 82 | 18 | 0 | 25000 | 10000 | 13 | 18 | opaque | N/A | 0.002 |
| 63.5 | 25 | 11.8 | 4000 | 4600 | 5 | 23 | clear | 0.005 | 0.002 |
| 61.8 | 25 | 13.9 | 4000 | 10000 | 10 | 26 | clear | 0.009 | 0.005 |
| 67.3 | 20 | 12.7 | 4000 | 20000 | 8.1 | 19.6 | translucent | 0.013 | 0.005 |

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A polyester block terpolymer comprising the following three different types of block units:
   an amorphous block comprising a polystyrene dicarboxylate;
   a crystallizable block comprising a polyethylene glycol; and
   an aliphatic diol block;
   wherein the amorphous block is a continuous phase and the crystallizable block is a dispersed phase, and wherein the dispersed phase is less than about 200 nanometers in size.

2. The polyester block terpolymer of claim 1, wherein the crystallizable block has a degree of crystallinity of at least 10 at a temperature below the glass transition temperature of the terpolymer.

3. The polyester block terpolymer of claim 1, wherein the block terpolymer has an optical transparency of at least 65 percent.

4. The polyester block terpolymer of claim 1, wherein the terpolymer is a random block terpolymer.

5. The polyester block terpolymer of claim 1, wherein the block terpolymer comprises between about 40 weight percent and about 90 weight percent of the polystyrene dicarboxylate.

6. The polyester block terpolymer of claim 1, wherein the block terpolymer comprises between about 10 weight percent and about 50 weight percent of the polyethylene glycol.

7. The polyester block terpolymer of claim 1, wherein the block terpolymer comprises between about 0.01 weight percent and about 40 weight percent of the aliphatic diol.

8. A substrate comprising the polyester block terpolymer of claim 1.

9. A data storage medium comprising the substrate of claim 8.

* * * * *